No. 897,776. PATENTED SEPT. 1, 1908.
F. P. PFLEGHAR.
MECHANICAL SEAL.
APPLICATION FILED MAR. 13, 1908.

Witnesses
M. Kutler
F. George Barry

Inventor:
Frank P. Pfleghar
By Brown＆Seward
his Attorneys

THE NORRIS PETERS CO., WASHINGTON, D. C.

UNITED STATES PATENT OFFICE.

FRANK P. PFLEGHAR, OF NEW HAVEN, CONNECTICUT.

MECHANICAL SEAL.

No. 897,776.  Specification of Letters Patent.  Patented Sept. 1, 1908.

Application filed March 13, 1908. Serial No. 420,834.

*To all whom it may concern:*

Be it known that I, FRANK P. PFLEGHAR, a citizen of the United States, and resident of New Haven, in the county of New Haven and State of Connecticut, have invented a new and useful Improvement in Mechanical Seals, of which the following is a specification.

My invention relates to a mechanical seal, with the object in view of providing a simple and effective device of this character for general use.

Figure 1:
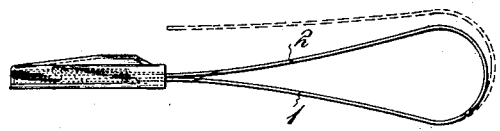
Figure 4:
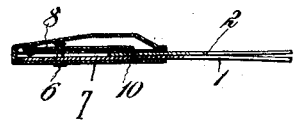
Figure 2:
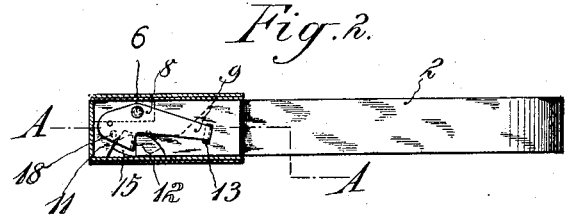
Figure 5:
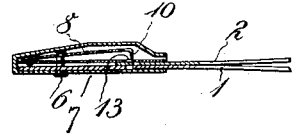
Figure 3:
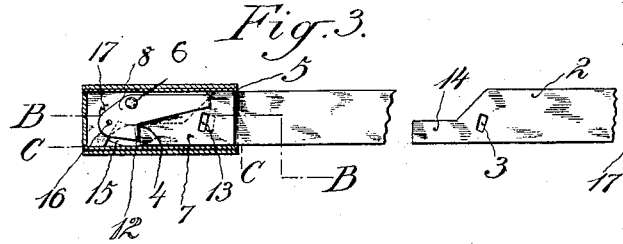
Figure 6:
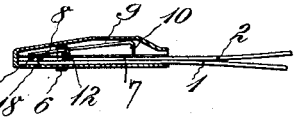

A practical embodiment of my invention is represented in the accompanying drawings, in which Figure 1 is a view of the seal in side elevation, showing the parts in full lines in the position which they assume when the seal is locked and showing in dotted lines the free or locking branch of the shackle in the position which it may assume before the seal is locked, Fig. 2 is a section taken edgewise through the casing showing the operating parts in top plan in locking position, Fig. 3 is a similar view showing the parts in the position which they assume before the seal is locked, Fig. 4 is a section in the plane of the line A—A of Fig. 2, Fig. 5 is a section in the plane of the line B—B of Fig. 3, and Fig. 6 is a section in the plane of the line C—C of Fig. 3.

That branch of the shackle which is permanently attached to the casing of the lock is denoted by 1 and the locking branch by 2. The free end of the locking branch 2 is provided with an opening 3 for the reception of a hook on the end of the locking spring.

The casing is denoted by 4 and may be formed of a piece of sheet metal struck into shape and folded over at its edges to completely inclose the locking portions save only at one end where there is a narrow opening 5 for the reception of the parts of the shackle.

The branch 1 of the shackle may be locked to the casing by means of a rivet 6 passing through the casing and through the part 1 and the said rivet may be extended through a thin plate 7 disposed within the casing at a distance from the part 1 of the shackle sufficient to permit the part 2 of the shackle to pass within the narrow opening 5 in the end of the casing between the thin plate 7 and the part 1.

The locking spring is denoted by 8 and is essentially a bell crank lever, one arm 9 of which is provided with a hooked end 10 in position to pass through the opening 3 in the end of the branch 2 of the shackle when the latter reaches its locking position within the casing and the other branch 11 of which is provided with a depending lip 12 in position to be engaged by the extreme end of the part 2 of the shackle as the latter is pushed into the casing.

The locking spring 8 is pivoted conveniently by the rivet 6 so as to swing to a limited extent edgewise on the thin intermediate plate 7. The intermediate plate 7 is provided with an opening 13 therethrough, which, when the end 2 of the shackle reaches its locking position, will register with the opening 3 in the end 2 of the shackle.

The swinging movement or rocking movement of the spring 8 is intended to be sufficient to swing the free or hooked end of the branch 9 of the spring from a position over the plate 7 at one end of the opening 13 into position over the opening 13 to permit its hooked end to pass through the opening 13 and through the opening 3 to lock the end 2 of the shackle in position.

The extreme end of the part 2 of the shackle may be reduced in width as shown at 14 to permit it to readily pass the rivet or pivot 6 and the said intermediate plate 7 is provided with a recess 15 to permit the lip 12 which extends downwardly through the opening 13 and across the space in which the end of the shackle slides to move back under the pressure of the end of the shackle when the latter is being inserted for locking purposes.

To retain the swinging or locking spring 8 against accidental displacement during the handling of the seal before it is finally used, the short arm 11 of the said rocking spring may be provided with a projection 16 on its inner face which may be formed by striking up the surface of the metal by means of a blunt pointed instrument, which projection may rest in either one or the other of two depressions, 17, 18, similarly formed in the plate 7, the depression 17 being in a position to receive the projection 16 when the spring 8 is swung into locking position and the depression 18 being in a position to receive the projection 16 when the spring is swung out of locking position.

To lock the seal, the end 2 of the shackle is inserted in the open end of the casing and pushed inwardly until its free end engages the lip 12 and then forced inwardly still further until the hooked end of the spring 8 has been swung over the opening 13 in the plate 7 at which time it will be directly over the opening 3 in the end 2 of the shackle and will automatically snap through the two openings 13 and 3 thereby locking the end 2 of the shackle permanently in position.

What I claim is:—

1. A mechanical seal comprising a suitable casing, a laterally rocking spring hook within the casing, a shackle having one end permanently secured to the casing and the opposite end perforated to receive the spring hook, the said spring hook being provided with a lip adapted to be engaged by the entering end of the shackle for rocking the hook into position to spring into the perforation in the shackle.

2. A mechanical seal comprising a suitable casing, a swinging spring hook pivoted within the casing, a shackle having one end permanently secured to the casing and the other end perforated and free to enter the casing, the said spring hook being under the control of the entering end of the shackle for swinging it into locking position and means for retaining the said swinging spring hook against unintentional movement during the handling of the seal.

3. A mechanical seal comprising a suitable casing, an edgewise swinging spring hook pivotally secured within the casing and provided with an operating lip and a shackle having one end permanently secured to the casing and the opposite end perforated to receive the spring hook and adapted to engage the said lip to rock the spring hook into locking position.

In testimony, that I claim the foregoing as my invention, I have signed my name in presence of two witnesses, this ninth day of March, 1908.

FRANK P. PFLEGHAR.

Witnesses:
  MAE D. CONATY,
  FRANCES I. MARTIN.